US009569257B2

(12) United States Patent
Richter et al.

(10) Patent No.: US 9,569,257 B2
(45) Date of Patent: Feb. 14, 2017

(54) METHOD AND SYSTEM TO PERFORM TIME CONSUMING FOLLOW-UP PROCESSES

(75) Inventors: Matthias Richter, Sinsheim (DE); Gisella Dominguez Anzuinelli, Heidelberg (DE)

(73) Assignee: SAP SE, Walldorf (DE)

( * ) Notice: Subject to any disclaimer, the term of this patent is extended or adjusted under 35 U.S.C. 154(b) by 1068 days.

(21) Appl. No.: 12/472,610

(22) Filed: May 27, 2009

(65) Prior Publication Data

US 2010/0306585 A1 Dec. 2, 2010

(51) Int. Cl.
*G06F 9/48* (2006.01)

(52) U.S. Cl.
CPC .................. *G06F 9/4843* (2013.01)

(58) Field of Classification Search
CPC .................................................. G06F 9/4843
See application file for complete search history.

(56) References Cited

U.S. PATENT DOCUMENTS

| | | | |
|---|---|---|---|
| 3,662,401 A | | 5/1972 | Collins et al. |
| 6,148,324 A | * | 11/2000 | Ransom et al. ............ 718/105 |
| 2005/0125793 A1 | * | 6/2005 | Aguilar et al. ............ 718/100 |
| 2005/0198636 A1 | * | 9/2005 | Barsness et al. ............ 718/100 |
| 2007/0220516 A1 | * | 9/2007 | Ishiguro et al. ............ 718/101 |
| 2008/0222640 A1 | * | 9/2008 | Daly et al. .................. 718/103 |
| 2009/0158294 A1 | * | 6/2009 | Perticara' .................... 718/106 |
| 2010/0153952 A1 | * | 6/2010 | Linder ......................... 718/101 |

OTHER PUBLICATIONS

European Search Report for EP 10 16 4036, dated Jan. 30, 2012.
Takeyama, Hiroshi, et al., Design Concept and Implementation of μITRON Specification for the H8/500 Series, 1989, pp. 48-53.
Tanenbaum, "Modern Operating Systems, Processes and Threads," Modern Operating Systems, Jan. 1, 2001, pp. 71-73, 81-83, 132-151, and 469-475. (XP002372417).
EPO Office Action issued in EP 10 164 036.5, dated Aug. 28, 2014.
Tanenbaum, A.S., "Modern operating systems, 2nd edition", Modern Operating Systems, Jan. 1, 2002, pp. 282-287, XP002301193.
EPO Action pursuant to Article 94(3) EPC dated Apr. 11, 2014.

* cited by examiner

*Primary Examiner* — Jacob A Petranek
(74) *Attorney, Agent, or Firm* — Jones Day

(57) ABSTRACT

A computer system may receive an instruction to perform an action on an object. A schedule manager may identify a set of processes associated with the action that need to be performed by the computer system. A subset of primary process and a subset of secondary processes may be identified from the set of processes associated with the action. The schedule manager may schedule an asynchronous process to perform the subset of secondary processes on the object. The computer system may perform the subset of primary processes on the object. The subset of secondary process may be performed by the asynchronous process based upon the scheduling.

25 Claims, 7 Drawing Sheets

FIG. 6

| Process | Est. Time | | Primary | Secondary |
|---|---|---|---|---|
| A | 1 sec | | ☐ | ☑ |
| B | 3 sec | | ☐ | ☑ |
| C | .1 sec | | ☑ | ☐ |
| D | 4 sec | | ☐ | ☑ |

Please identify primary processes and secondary processes

600 / 610 / 620 / 630 / 640 / 650

CANCEL    SUBMIT

Identify Processes

Identify Dependency Information

710

Please identify dependency information for the following processes

| Process | Depends Upon | Primary | Secondary |
|---------|--------------|---------|-----------|
| A | null | ☑ | ☐ |
| B | A | ☐ | ☑ |
| C | B | ☐ | ☑ |
| D | C | ☐ | ☑ |

720   730   740   750

CANCEL   SUBMIT

METHOD AND SYSTEM TO PERFORM TIME CONSUMING FOLLOW-UP PROCESSES

BACKGROUND

Within many applications running on a computer system, there may be actions initiated by a user that trigger a series of processes to be performed by the system. After a user has triggered a particular action, control is transferred to the system to perform the series of processes. Control of the system conventionally would not return to the user until all processes have been completed. The series of processes may need to be performed on a plurality of data objects within the computer system. During this time, the user of the system must wait until the series of processes has been completed by the system and control of the system is transferred back to the user.

In modern computing, users are likely to become dissatisfied with a delay while processes are being performed by the system. A delay of only a few seconds may seem inconvenient to some users. Therefore, it is desirable to optimize the period of time a user must wait for a series of processes to be performed by the system.

BRIEF DESCRIPTION OF THE DRAWINGS

FIG. 6 illustrates a user-interface for use in one embodiment.

FIG. 7 illustrates a user-interface for use in one embodiment.

DETAILED DESCRIPTION

Figure 1:
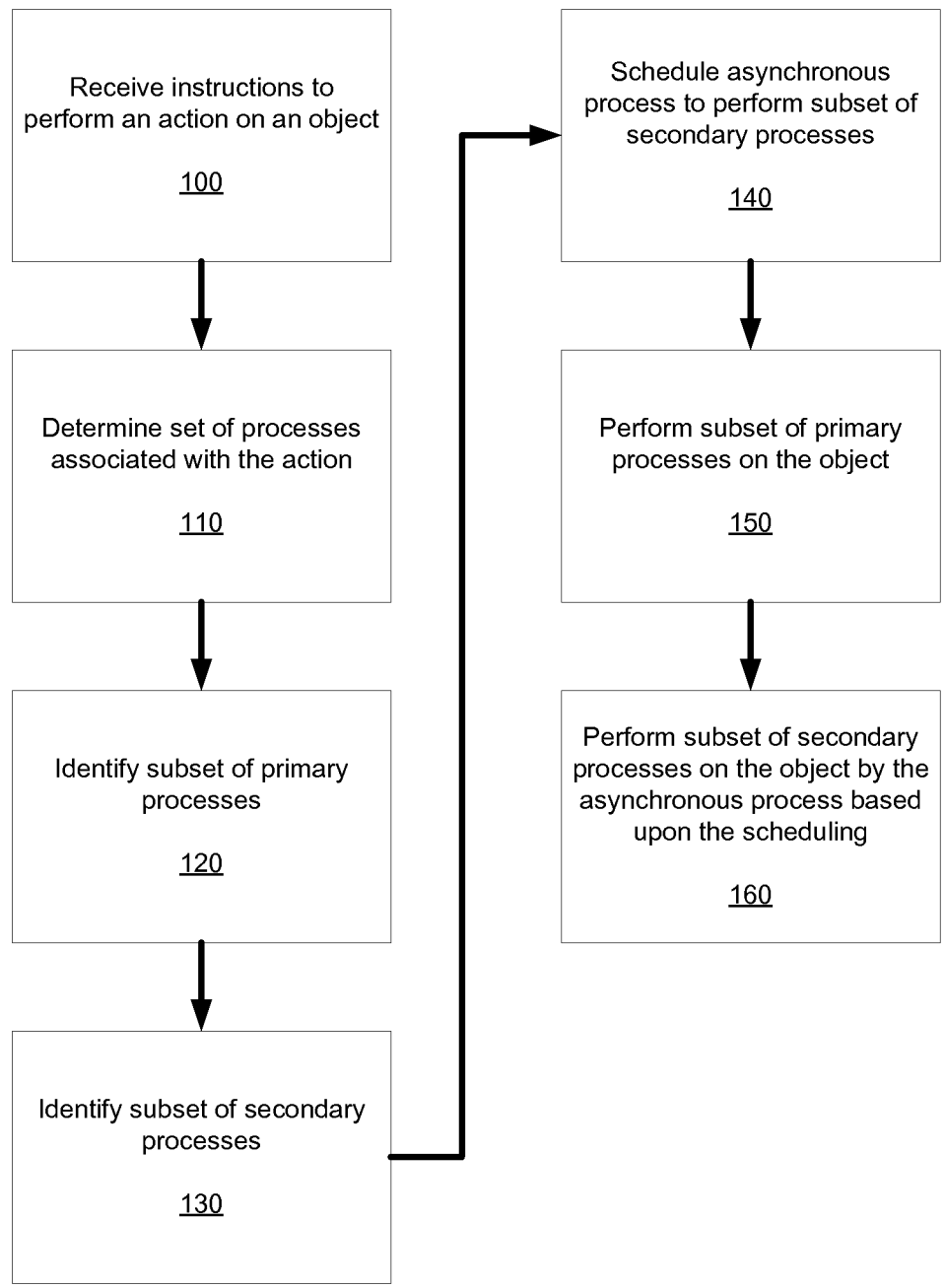
FIG. 1 is a logic flow diagram illustrating one embodiment of a method for delaying time consuming follow-up processes.

Various embodiments disclose a method to perform time consuming follow-up processes asynchronously from user control. In one embodiment, a computer system may receive an instruction to perform an action representing a system transaction. A scheduling manager may identify a set of processes associated with the action that need to be performed by the computer system. A subset of primary processes and a subset of secondary processes may be identified from the set of processes associated with the action. The scheduling manager may schedule asynchronous processes to perform the subset of secondary processes on the object. The computer system may perform the subset of primary processes on the object directly in response to a user command. The subset of secondary processes may be performed by the asynchronous process based upon the scheduling by the scheduling manager.

In one embodiment, a user may trigger an action to be performed by the system. For example, the user may want to hire a new employee using a human resources application of an enterprise management system. To enter a new employee into the system, a new hire action may need to be initiated. A new hire action may be coded in the system as a series of processes to be performed by the system, such as generating employee agreements, updating compensation data, creating a new user within the system and generating a time agreement. The series of processes may need to be performed on a plurality of data objects within the system, some of which could be quickly generated. The system may also store pre-identified primary and secondary classifications for the series of processes. Primary processes may be processes that the user requires to be performed synchronously. Secondary processes may be time-intensive processes that the user does not require to be completed immediately, for example. In addition, processes may be identified as primary or secondary based upon dependency information. In order to reduce the time required to return control of the system to the user after the hire action has been initiated, the secondary processes may be scheduled to be performed asynchronously.

In one embodiment, the scheduling manager may identify which processes should be designated as primary processes. Likewise, the scheduling manager may identify which processes should be designated as secondary processes. For example, the scheduling manager may identify processes as primary or secondary based upon dependency information or based upon system activity. In one embodiment, each process is classified as primary or secondary based upon the convenience of the user. The embodiments are not limited by this example.

In one embodiment, dependency information may be used to identify primary and secondary process by the scheduling manager. For example, a set of process may need to be performed based upon a triggered action. Some processes within the set of processes may depend upon the completion of other processes within the set of processes. Using dependency information, the scheduling managing may schedule processes that are not dependent upon other processes to be performed synchronously. Similarly, the scheduling manager may schedule processes that are dependent upon the completion of other processes asynchronously. The asynchronously scheduled processes may be scheduled to be completed dynamically based upon the completion of the synchronously scheduled processes. Alternatively, the asynchronously scheduled processes may be scheduled at a time after which the synchronously scheduled processes are known to have been completed.

FIG. 1 illustrates one embodiment of the present invention. At block 100, an instruction is received to perform an action on an object. For example, a user may wish to hire a new employee by performing a new hire action in a computer system. When a new hire action is initiated, a plurality of processes may need to occur. The plurality of processes may need to be performed on a plurality of data objects within the computer system.

At block 110, a scheduling manager identifies a set of processes associated with the initiated action. The set of processes may include the generation of employment agreements, updating compensation data, creating a new user within a computer system and creating a new email address in the computer system, for example. Each process may be associated with a data object within the computer system. Some of these processes may be executed by the computer system relatively quickly. However, some processes may require significant processing time. In addition, some processes may be dependent upon the completion of other processes.

At block 120, a subset of primary processes is identified. The subset of primary processes may be identified by the scheduling manager within the system. The scheduling manager may access data within the system identifying primary processes. The data within the system may include dependency information. Primary processes may includes processes that the user requires immediately. Alternatively, the scheduling manager may identify a subset of primary processes based upon the estimated time required to complete each process. Using this information, the scheduling manager may identify a subset of primary processes. For example, processes required immediately, associated with a low estimated processing time or processes not dependent upon the completion of other processes may be identified as primary processes.

At block 130, a subset of secondary processes may be identified. As with the subset of primary processes, the scheduling manager may access data within the system identifying secondary processes. The data within the system may include dependency information. The dependency information may indicate which processes are dependent upon the completion of other processes. The scheduling manager may identify the subset of secondary processes based upon dependency information. In addition, secondary processes may include processes that the user does not require immediately and may be performed later. Further, the identification of secondary processes by the scheduling manager may be based upon the estimated time of each process to be completed. For example, processes that are not immediately required, that are associated with a high estimated time or are dependent upon other processes may be identified as secondary processes.

At block 140, the scheduling manager may schedule an asynchronous process to perform the subset of secondary processes. The asynchronous process may be scheduled at a time that is more convenient to the user. In one embodiment, the asynchronous process may be scheduled based upon system activity. For example, the asynchronous process may be scheduled during a time when the user will not be using the system or during a time when the user is working on another object and will not be affected by the secondary processes.

At block 150, the subset of primary processes are performed by the system. After the completion of the subset of primary processes, control of the computer system is returned to the user. In one embodiment, the object associated with the triggered action may include a follow-up process status identifier. The follow-up process status identifier may be updated to reflect the completion of the subset of primary processes. The follow-up process status identifier may also be updated to reflect that pending secondary processes associated with the initiated action have not been completed.

At block 160, the subset of secondary processes is performed based upon the scheduling done during block 140. The asynchronous process is used to perform the subset of secondary processes during the time period designated by the scheduling manager. In one embodiment, a follow-up process status identifier may updated to reflect the completion of the subset of secondary processes.

Figure 2:
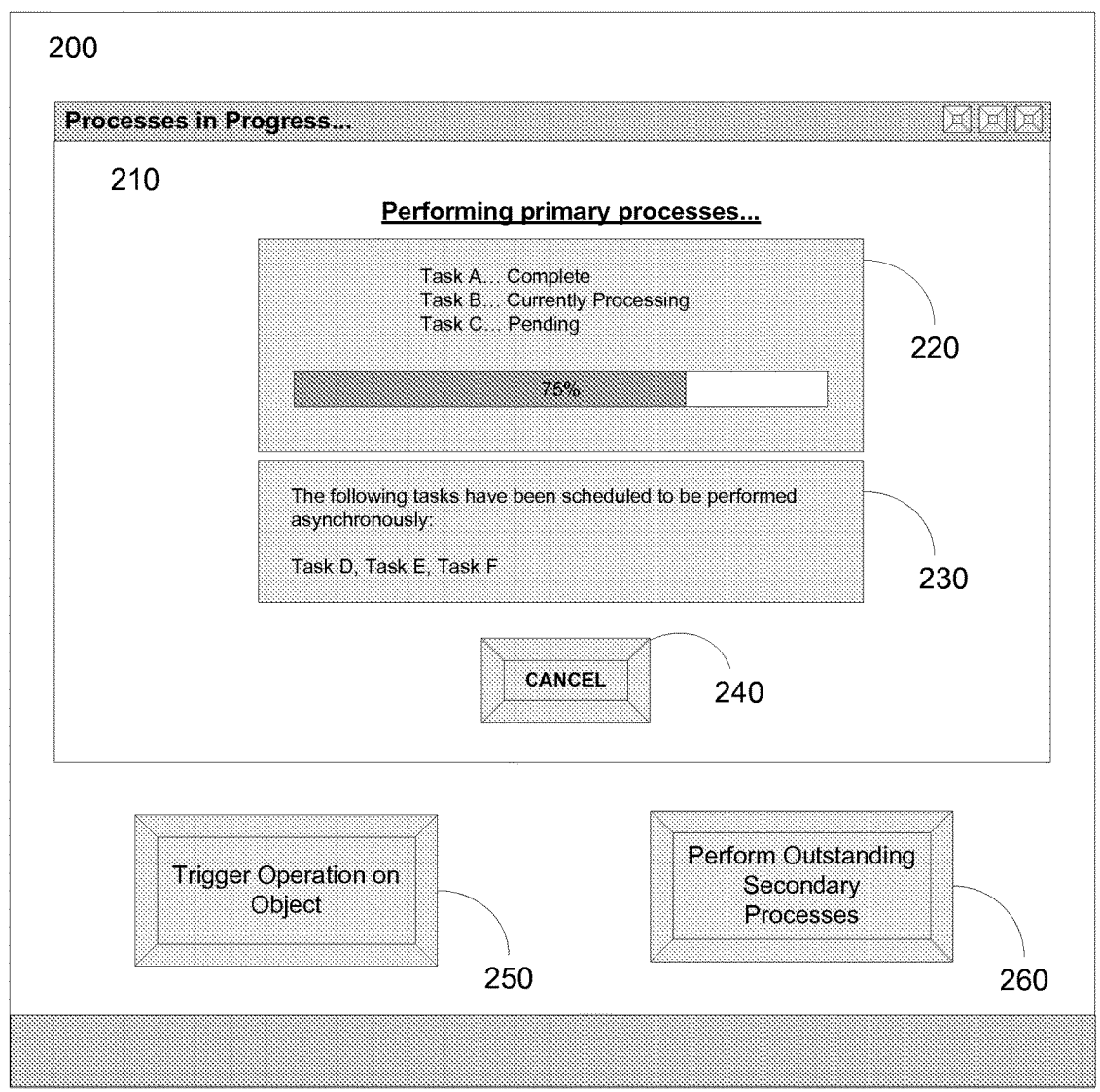
FIG. 2 illustrates a user-interface for use in one embodiment.

FIG. 2 illustrates a user interface 200 that may be used to perform the method as described by the logic flow illustrated within FIG. 1. User interface 200 may include several user interface elements capable of interaction with the user of a computer system. User interface 200 may be implemented using instructions that are stored on a computer-readable storage medium and executed by a processor.

In various embodiments, user interface 200 may include window 210. Window 210 may be a pop-up or notification window that appears after an operation has been triggered by the user. A user may trigger an operation by clicking button 250. Button 250 may allow a user to initiate a hire action, a termination action or other actions that are capable of being performed by the system. Alternatively, an operation may be triggered by the system. Window 210 may include various user interface elements. For example, window 210 may include user interface element 220. User interface element 220 may display information to the user regarding the status of primary processes being performed in response to a triggered operation on an object. As illustrated, user interface element 220 shows that task A has been completed, task B is currently processing and task C is pending. In addition, user interface element 220 may include a progress bar to indicate the progress of the primary processes.

In one embodiment, user interface 200 may include user interface element 230. User interface element 230 may be used to display secondary processes to a user. For example, user interface element 230 may list secondary processes to be performed asynchronously in response to a triggered operation on an object. As illustrated, task D, task E and task F have been scheduled to be performed asynchronously. In some situations, a user may wish to cancel the triggered operation. Button 240 may be used to direct the scheduling manager to abort the triggered operation on an object.

User interface 200 may also include button 260. Button 260 may allow a user to manually perform outstanding secondary processes. For example, the scheduling manager may have scheduled several subsets of secondary processes to performed at a later point in time. A user may decide to manually perform the outstanding secondary processes during a time that is convenient for the user. In one embodiment, in response to user interaction with button 260, a FINISH_FOLLOW_UP_PROCESS command may be initiated on all pending secondary processes. If a user chooses to manually perform the outstanding secondary processes, the scheduling manager may only perform the secondary processes that are not dependent upon other or whose parent processes have been successfully completed. If a secondary process has uncompleted parent processes, the scheduling manager may perform the secondary process as soon as all parent processes have been successfully completed.

In one embodiment, the steps performed by the scheduling manager are unknown to the user of a system. For example, after a user has triggered an operation to be performed by the system, the scheduling manager may schedule primary and secondary processes without informing the user. The primary and secondary processes may then be performed as scheduled by the scheduling manager in the background without displaying information to the user. The embodiments are not limited to this example.

Figure 3:
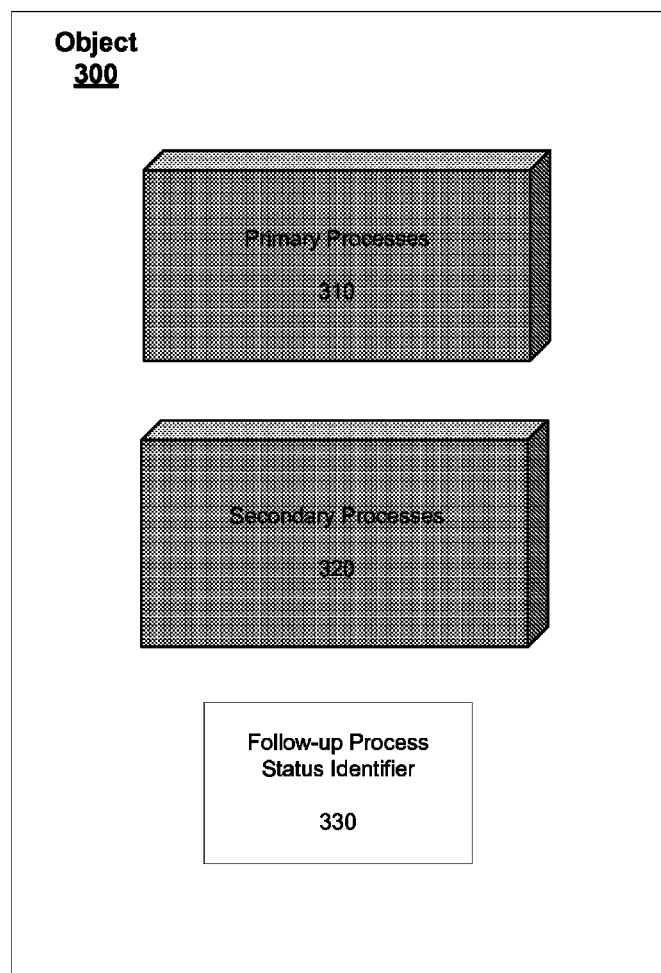
FIG. 3 illustrates one embodiment of a data object.

FIG. 3 illustrates an object 300 according to one embodiment. Object 300 may be a data object within an enterprise application. Object 300 may be implemented using instructions that are stored on a computer-readable storage medium and executed by a processor. Object 300 may include primary processes 310 and secondary processes 320. Primary processes 310 may include one or more primary objects. Similarly, secondary processes 320 may include one or more secondary objects. In various embodiments, primary processes 310 and secondary processes 320 may be pre-identified within object 300. Alternatively, primary processes 310 and secondary processes 320 may be identified by a scheduling manager after an action has been initiated on object 300.

Object 300 may include a follow-up process status identifier 330. For example, follow-up process status identifier 330 may indicate that the primary processes are completed, pending, currently being processed, no longer necessary, or waiting to be processed. In one embodiment, follow-up process status identifier 330 may updated to reflect the completion of the subset of primary processes. The follow-up process status identifier may also be updated to reflect that pending secondary processes associated with the initiated action have not been completed. For example, follow-up processes status identifier 330 may indicate that the secondary processes are completed, pending, currently being processed, no longer necessary, or waiting to be processed. In one embodiment, follow-up process status identifier 330 may updated to reflect the completion of the subset of secondary processes.

In various embodiments, when an action is initiated on object 300, an instance of a scheduling manager may be created that corresponds directly to object 300. The scheduling manager instance may be terminated when all processes, primary and secondary, have been performed by a computer system. In one embodiment, during the time that an instance of a scheduling manager is associated with object 300, a computer system may "lock" object 300 so that other scheduling manager instances may not be created to modify object 300. By "locking" object 300, the system may avoid potentially conflicting processes related to object 300. The embodiments are not limited by this example.

Figure 4:
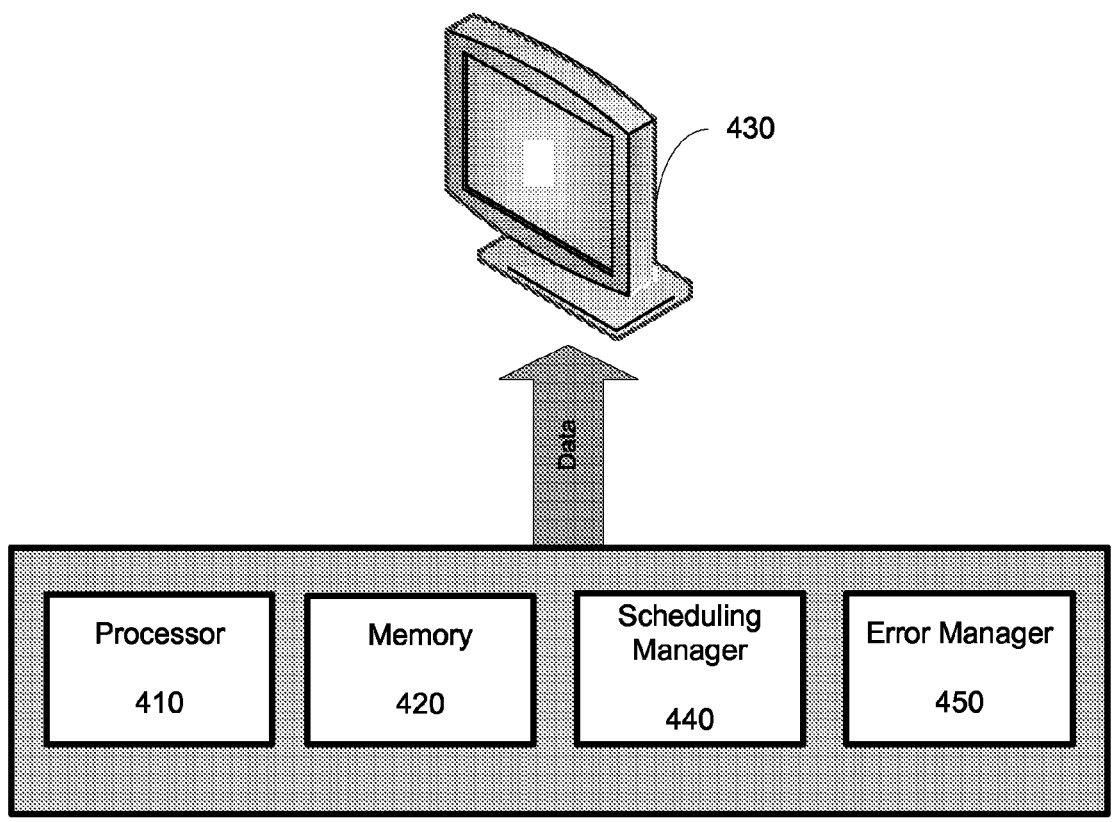
FIG. 4 illustrates one embodiment of a system.

FIG. 4 illustrates a system according to one embodiment. System 400 may comprise processor 410, memory 420, display device 430 and scheduling manager 440. Processor 410 may be used to execute instructions stored on memory 420. Memory 420 may be a computer-readable storage medium used to store data and instructions. For example, memory 420 may be used to store an enterprise application. The embodiments are not limited to this example.

In various embodiments, system 400 includes scheduling manager 440. Scheduling manager 440 may be used to identify primary and secondary processes. Once primary processes and secondary processes are identified, scheduling manager 440 may schedule an asynchronous process to perform the identified secondary processes.

In various embodiments, system 400 includes error manager 450. Error manager 450 may monitor the progress of all processes being executed by a system, primary and secondary. Some processes, such as secondary processes, for example, may be dependent upon the successful completion of other processes, such as primary processes, for example. Error manager 450 may provide information to scheduling manager 440 regarding the successful completion of one or more processes by the system. Likewise, error manager 450 may identify failed processes. For example, if a process has not successfully completed, error manager 450 may inform scheduling manager 440 that a failed process has been identified. At that point, scheduling manager 440 may re-schedule the failed process and one or more processes that are dependent upon the failed process. If error manager 450 identifies the same process as a failed process multiple times, it may provide an error message to a technical user or system administrator. For example, the error manager 450 may provide an error message after a pre-determined number of failures of the same process. The error message may be sent via pop-up message, email, text message, phone or other communication medium known in the art. The error message may include as much information as possible about the nature and reasons for the failed process. In addition, the error message may include instructions on how to correct the cause of the failed process.

In various embodiment, system 400 may include display device 430. Display device 430 may be used to display information to a user of system 400. For example, display device 430 may be used to display user interface information to a user of system 400.

Figure 5:
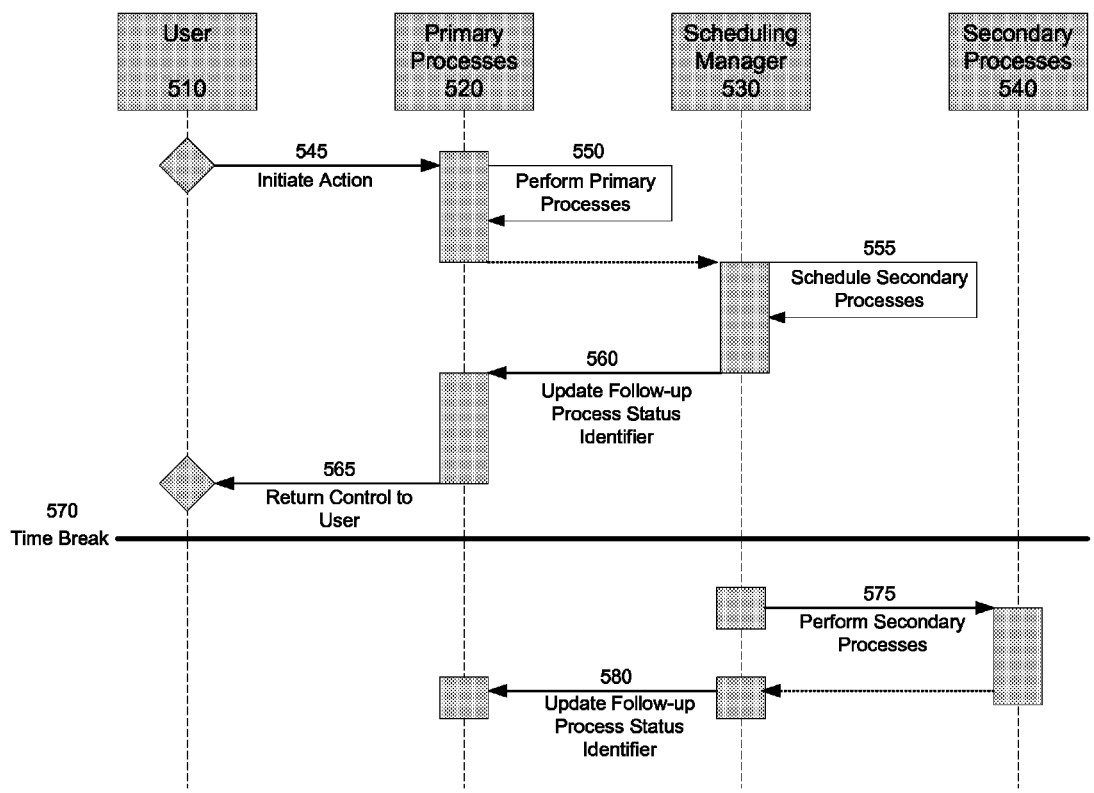
FIG. 5 illustrates a timing diagram.

FIG. 5 illustrates a timing diagram according to one embodiment. As shown, user 510 may initiate an action at step 545. For example, user 510 may initiate a hire action within an enterprise application. The hire action may require a series of processes to be performed on one or more data objects. For example, each process may be identified as either a primary process or a secondary process. The identification of processes may be based upon data stored in a database or using scheduling manager 530.

At step 550, identified primary processes may be performed. Scheduling manager 530 may be responsible for scheduling secondary processes at step 555. Secondary processes may be scheduled by scheduling manager 530 based upon data stored in a database, such as dependency information. After the secondary processes have been scheduled by the scheduling manager 530, a follow-up process status identifier is updated by scheduling manager 530. At step 565, control of the system is returned to user 510.

In various embodiments, time break 570 may occur after control of the system has been returned to the user at step 565. Time break 570 may be a scheduled period of time or may be identified dynamically based upon the activity of a computer system. In one embodiment, time break 570 may be identified by scheduling manager 530. Further, time break 570 may be interrupted by a user initiated command to process pending secondary processes.

At step 575, scheduling manager 530 initiates the performance of the scheduled secondary processes. At step 580, scheduling manager 530 updates the follow-up process status identifier to reflect the completion of the scheduled secondary processes.

FIG. 6 illustrates a user interface 600 that may be used to perform the method as described by the logic flow illustrated within FIG. 1. User interface 600 includes several user interface elements capable of interaction with the user of a computer system. User interface 600 may be implemented using instructions that are stored on a computer-readable storage medium and executed by a processor.

User interface 600 may be used by a technical user or system administrator. User interface 600 includes window 610. Window 610 may be a window within an enterprise application. For example, window 610 may be a pop-up or notification window that appears after a user has interacted with another element of user interface 600. In one embodiment, window 610 is used to collect settings related to a particular action. Once the settings are submitted to the system, the settings may be saved within a database. The saved settings may be automatically retrieved and applied to a data object when a user initiates a particular action in the future.

Window 610 includes several data elements that are presented to a user of the computer system. The user may be a technical user or system administrator. Data element 620 lists each process that is required to perform an action on a data object. Data element 630 lists the estimated time for each process to be completed. The estimated time may be computed based upon the execution of past processes or using an algorithm. Further, the data may be pre-delivered by the software system. Data element 640 includes a set of elements that may be chosen by the user. The set of elements illustrated in data element 640 are used to indicate that a corresponding process is a primary process. As shown, process C has been selected as a primary process. Similarly, data element 650 includes a set of elements that may be used to indicate that a process is a secondary process. As shown, processes A, B and D have been identified as secondary processes.

FIG. 7 illustrates a user interface 700 that may be used to perform the method as described by the logic flow illustrated within FIG. 1. User interface 700 includes several user interface elements capable of interaction with the user of a computer system. User interface 700 may be implemented using instructions that are stored on a computer-readable storage medium and executed by a processor.

User interface 700 may be used by a technical user or system administrator. User interface 700 includes window 710. Window 710 may be a window within an enterprise application. For example, window 710 may be a pop-up or notification window that appears after a user has interacted with another element of user interface 700. In one embodiment, window 710 is used to collect settings related to a particular action. Once the settings are submitted to the system, the settings may be saved within a database. The saved settings may be automatically retrieved and applied to a data object when a user initiates a particular action in the future.

Window 710 includes several data elements that are presented to a user of the computer system. The user may be a technical user or system administrator. Data element 720 lists each process that is required to perform an action on a data object. Data element 730 lists dependency information for each process to be completed. The dependency information may be computed based upon the execution of past processes or using an algorithm. Further, the dependency information may be pre-delivered by the software system. In addition, a technical user or system administrator may enter the dependency information. As illustrated, process A is not dependent upon any other processes as denoted by the label "null." Process B is dependent upon process A, process C is dependent upon process B and process D is dependent upon process C. While the dependency information illustrated may only show a single dependency for each of processes B, C and D, it can be appreciated that dependency information may be much more complex. For example, a single process may be dependent upon any number of other processes. In addition, parent processes may depend upon any number of other processes.

Data element 740 includes a set of elements that may be chosen by the user. The set of elements illustrated in data element 740 are used to indicate that a corresponding process is a primary process. As shown, process A has been selected as a primary process. Similarly, data element 750 includes a set of elements that may be used to indicate that a process is a secondary process. As shown, processes B, C and D have been identified as secondary processes. Data elements 740 and 750 may be automatically calculated by the system based upon dependency information from data element 730.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It should be noted that the methods described herein do not have to be executed in the order described, or in any particular order. Moreover, various activities described with respect to the methods identified herein can be executed in serial or parallel fashion.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. It is to be understood that the above description has been made in an illustrative fashion, and not a restrictive one. Combinations of the above embodiments, and other embodiments not specifically described herein will be apparent to those of skill in the art upon reviewing the above description. Thus, the scope of various embodiments includes any other applications in which the above compositions, structures, and methods are used.

We claim:

1. A computer-implemented method for delaying processes comprising:
    receiving, by a system, an instruction to perform an action on an object;
    identifying, by a processor, a set of processes associated with the action to be performed by the system;
    identifying, by the processor, for each process in the identified set of processes (i) whether a respective process is flagged to indicate that the respective process must be performed immediately, (ii) a processing time to complete the respective process, and (iii) whether the respective process depends on a completion of a process;
    classifying all processes in the identified set as either secondary or primary processes based on (i) whether the processes are not flagged to indicate immediate performance, (ii) the processing time of each process to be completed, and (iii) whether the processes do not depend on the completion of any other process;
    synchronously performing any remaining processes in the identified set not classified as secondary processes;
    scheduling asynchronous performance of the secondary processes by a scheduling manager based on system activity; and
    performing the secondary processes based upon the scheduling.

2. The method of claim 1, further comprising classifying the processing time of each process to be completed according to at least one of a low estimated processing time or a high estimated processing time.

3. The method of claim 1, further comprising scheduling the asynchronous performance of the secondary processes for times when an object associated with -the secondary processes is not used.

4. The method of claim 1, further comprising scheduling the asynchronous processes when the system is not used.

5. The method of claim 1, wherein at least one secondary process is manually executed based upon received user input.

6. The method of claim 1, further comprising:
identifying by an error manager a failed process from the set of processes associated with the action to be performed by the system;
re-scheduling by the scheduling manager the failed process and any processes dependent from the failed process.

7. The method of claim 6, wherein the error manager generates an error message if the failed process is identified a pre-determined number of times during the action to be performed by the system.

8. The method of claim 1, wherein the object includes a follow-up process status identifier.

9. The method of claim 8, wherein the follow-up process status identifier is updated by the scheduling manager based upon the status of a respective process in the set of identified processes.

10. An article comprising a non-transitory computer-readable storage medium including instructions that, when executed by a processor, perform the steps of:
receiving, by a system, an instruction to perform an action on an object;
identifying, by the processor, a set of processes associated with the action to be performed by the system;
identifying, by the processor, for each process in the identified set of processes (i) whether a respective process is flagged to indicate that the respective process must be performed immediately, (ii) a processing time to complete the respective process, and (iii) whether the respective process depends on a completion of a second process;
classifying all processes in the identified set as either secondary or primary processes based on (i) whether the processes are not flagged to indicate immediate performance, (ii) the processing time of each process to be, and (iii) whether the processes do not depend on the completion of any other process;
synchronously performing any remaining processes in the identified set not classified as secondary processes;
scheduling asynchronous performance of the secondary processes by a scheduling manager based on system activity;
performing the secondary processes based upon the scheduling.

11. The article of claim 10, wherein the classifying of the processing time of each process to be completed is according to at least one of a low estimated processing time or a high estimated processing time.

12. The article of claim 10, wherein the asynchronous performance of the secondary processes is scheduled for times when an object associated with the secondary processes is not used.

13. The article of claim 10, wherein the asynchronous performances are scheduled when the system is not used.

14. The article of claim 10, wherein at least one secondary process is manually executed based upon received user input.

15. The article of claim 12, further comprising instructions that, when executed by a processor, perform the steps of:
identifying by an error manager a failed process from the set of processes associated with the action to be performed by the system;
re-scheduling by the scheduling manager the failed process and any processes dependent from the failed process.

16. The article of claim 15, wherein the error manager generates an error message if the failed process is identified a pre-determined number of times during the action to be performed by the system.

17. The article of claim 10, wherein the object includes a follow-up process status identifier.

18. The article of claim 17, wherein the follow-up process status identifier is updated by the scheduling manager based upon the status of a respective process in the set of identified processes.

19. A computer system for delaying processes comprising:
a processor to receive an instruction to perform an action on an object;
a memory; and
a scheduling manager stored on the memory, the scheduling manager to:
identify a set of processes associated with the action to be performed by the system;
identify for each process in the identified set of processes (i) whether a respective process is flagged to indicate that the respective process must be performed immediately, (ii) a processing time to complete the respective process, and (iii) whether the respective process depends on a completion of a process;
classify all processes in the identified set as either secondary or primary processes based on (i) whether the processes are not flagged to indicate immediate performance, (ii) the processing time of each process to be completed, and (iii) whether the processes do not depend on the completion of any other process;
direct the processor to synchronously perform any remaining processes in the identified set not classified as secondary processes;
schedule asynchronous performance of the secondary processes by a scheduling manager based on system activity; and
direct the processor to perform the secondary processes based upon the scheduling.

20. The computer system of claim 19, wherein the scheduling manager classifies the processing time of each process to be completed according to at least one of a low estimated processing time or a high estimated processing time.

21. The computer system of claim 19, wherein the scheduling manager schedules the asynchronous performance of the secondary processes for times when an object associated with the secondary processes is not used.

22. The computer system of claim 19, wherein the scheduling manager schedules the asynchronous performance of the secondary processes when the system is not used.

23. The computer system of claim 20, wherein the system further comprises:

an error manager to identify a failed process from the set of processes associated with the action to be performed by the system; and the scheduling manager to reschedule the failed process and any processes dependent from the failed process.

24. The computer system of claim 19, wherein the object includes a follow-up process status identifier.

25. The computer system of claim 24, wherein the follow-up process status identifier is updated by the scheduling manager based upon the status of a respective process in the set of identified processes.

* * * * *